No. 807,990. PATENTED DEC. 19, 1905.
W. T. BALL.
PROCESS OF MILLING COTTON SEED.
APPLICATION FILED JUNE 17, 1903.
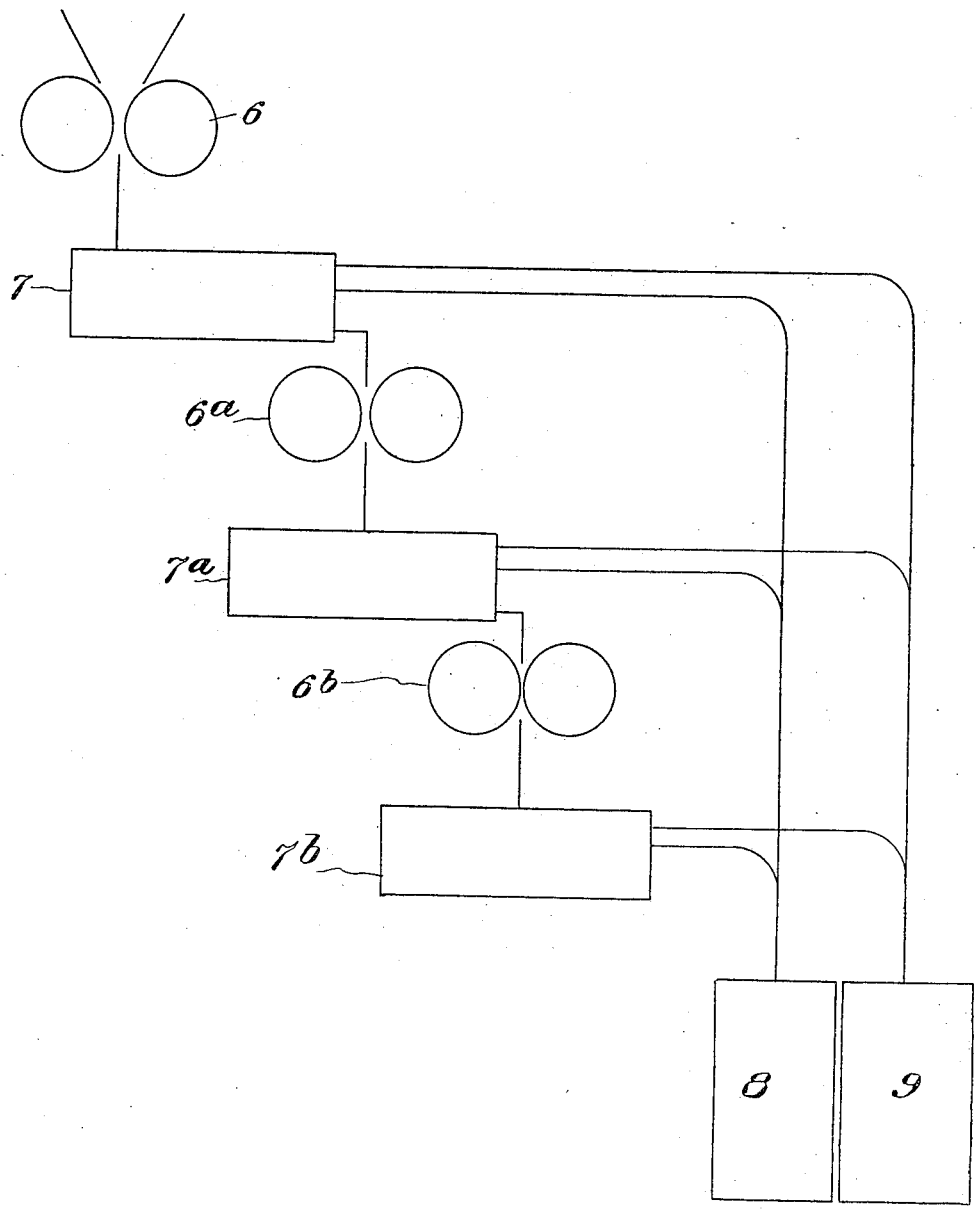
Witnesses
M. E. Corder
Geo. E. Tew
Inventor
Wm. T. Ball
by Milo B. Stevens & Co.
Attorneys

UNITED STATES PATENT OFFICE.

WILLIAM T. BALL, OF CHARLESTON, SOUTH CAROLINA, ASSIGNOR OF ONE-FIFTH TO HAMPTON K. LEA AND ONE-FIFTH TO GEORGE S. LE-GARE, OF CHARLESTON, SOUTH CAROLINA; ONE-FIFTH TO THOMAS R. HARNEY, OF WASHINGTON, DISTRICT OF COLUMBIA, AND ONE-FIFTH TO CHARLES MINER, OF CHESTER, SOUTH CAROLINA.

PROCESS OF MILLING COTTON-SEED.

No. 807,990.     Specification of Letters Patent.     Patented Dec. 19, 1905.

Application filed June 17, 1903. Serial No. 161,874. Substituted for abandoned application filed November 5, 1902, Serial No. 130,130.

*To all whom it may concern:*

Be it known that I, WILLIAM T. BALL, a citizen of the United States, residing at Charleston, in the county of Charleston and State of South Carolina, have invented new and useful Improvements in Processes of Milling Cotton-Seed, of which the following is a specification.

This invention comprises a process of milling or hulling cotton-seed; and the object thereof is to make a more perfect hulling and separation of the meats from the hulls without the loss of any of the oil or as little as possible.

It is characteristic of cotton-seed that it is of different sizes and shapes within certain limits, particularly as it comes to the oil-mills gathered from different counties or States, in which variation of soil or other conditions produces seed of various sizes. It is also characteristic of cotton-seed that its hull is tough, rather than brittle, and requires a cutting or shearing action instead of a crushing action to remove the hull.

In the present state of the art of hulling and separating cotton-seed the seed is run through a single huller or pair of cutting-rolls or other hulling devices and then the hulls and meats are separated and the oil is extracted from the latter. This oil is contained in small cells in the meat of the berry, and it is perhaps needless to say that it is the most valuable part of the seed.

To effect the greatest economy of operation and value of product, it is essential that the hulls of all the seed be cut and removed and also that none or as few as possible of the meats be broken or crushed. If the meats are broken, a corresponding part of the oil escapes and is quickly absorbed by the hulls and goes off into product worth about three dollars per ton, whereas the oil itself is worth about ninety dollars per ton. By the existing methods if the hulling devices are set so close as to catch and hull the small seed the fat meats of the large and medium-sized berries are broken and practically ground into meal. The result of this is to lose a large portion of the oil by absorption into the hulls. If, on the other hand, the hulling devices be set farther apart, the small seed goes through uncut, with consequent loss thereof.

It has been found by experience in well-regulated mills that under existing methods when the hulling devices are set to greatest economy of operation only about five per cent. of the meats are delivered uncut and a considerable portion of the fine seed passes through uncut, both of which conditions are objectionable and wasteful. It will be appreciated that when ninety-five per cent. of the meats are more or less cut or broken a considerable portion of oil escapes or is lost.

It is the object of my invention to remedy these defects and to provide a process by which all of the seed large and small will be cut with least breakage of the meats containing the oil. This object is effected by a series of cuts gradually running from coarse to fine and a separation of the meats, the hulls, and the uncut seed after each reduction, the cutting-rolls or hulling devices being gaged according to the size of the uncut seed. I have found by experiment that three passes are ordinarily sufficient to reduce the seed with greatest economy.

The separation may be effected in the commonly-practiced way by separating devices which separate the meats from the uncut seed and hulls, the latter passing through the next hulling device, followed by a similar separation, or the meats and the hulls and the uncut seed may be separated from one another, the meats passing to the crushing-rolls, the hulls to the hull-house, and the uncut seed to the next succeeding hulling device, and so on, the essential step of the separation being the extraction of the meats, as far as possible, after each pass from the stock which is to pass to the next hulling device, and thus prevent as far as possible breaking or disintegration of the meats. As indicated above, the practice of the process is not restricted to the use of the exact type of hulling mechanism herein disclosed.

One way of carrying out the process is diagrammatically illustrated in the accompanying drawing, and referring thereto 6 indicates the first pair of hulling-rolls, and these are gaged to cut only the hulls of larger size of seed. Thence the chop, including the uncut medium and small-sized seed, goes to the separator, (indicated at 7.) This is preferably of the reciprocating screen kind, dividing the chop into uncut seed, hulls, and meats, and the seed is delivered to the second or medium rolls 6$^a$, where the operation is repeated through the second separator 7$^a$, and finally through the fine rolls 6$^b$ and third separator 7$^b$, which, as I have found, will quite completely reduce all the seed. Necessarily, the successive separators are progressively finer in accordance with the smaller size of the meats, hulls, and unbroken seed delivered from each pair of rolls. The separated meats and hulls are indicated as being conveyed to discharges 8 and 9, respectively.

I have found by experiment that my process will deliver about seventy-five per cent. of the meats unbroken with but a trace of oil in the hulls and with absolutely perfect hulling of all the seeds, which cannot be done by existing methods, thereby reducing the loss from about six per cent., as is common now in the best mills, to less than one per cent., and insuring an increased yield of oil amounting to one and a half or two gallons to a ton of seed. The desired effect, as will be seen, is to get the meats as coarse and unbroken as possible and yet break all the grain, and a distinguishing feature of the process is the operation upon a seed the hull of which will not burst or crack by a crushing action without crushing the meats, and which therefore requires for its perfection a cutting process in which the hulls are cut or chipped off without cutting or crushing the meats.

What I claim as new, and desire to secure by Letters Patent, is—

1. The process of hulling cotton-seed of various sizes without disintegrating the meats; consisting, essentially, in passing the seed through a graduated series of pairs of hull-cutting rolls, set successively closer together and cutting and removing the hulls of seeds of successively smaller size without disintegrating the meats, and separating the hulls and meats from the uncut seed after each cut.

2. The process of hulling cotton-seed of various sizes without disintegrating the meats, consisting in extracting the whole meats from the hulls of successively smaller sizes of the seed at several successive cuts, and separating the meats and hulls from the uncut seed after each cut, substantially as described.

3. The process of hulling cotton-seed consisting in passing the seed through a succession of hulling devices of gradually-decreasing clearance, set to remove the hulls, and to extract the meats substantially without disintegration thereof, from the seed at the several successive passes, and separating the meats from the hulls and uncut seed after each pass.

4. The process of hulling cotton-seed of various sizes without substantial disintegration of meats, consisting, essentially, in passing the seed through a graduated series of hull-cutting devices set successively closer together and cutting and removing the hulls of seeds of successively smaller size without substantial disintegration of meats, and separating the meats from the uncut seed after each pass.

In testimony whereof I have signed my name to this specification in the presence of two subscribing witnesses.

WILLIAM T. BALL.

Witnesses:
ELIZABETH MORAN,
BEN. H. HARVIN.